United States Patent [19]

Funk

[11] Patent Number: 4,529,000
[45] Date of Patent: Jul. 16, 1985

[54] FLOW VOLUME PROPORTIONING SYSTEM

[75] Inventor: Roger C. Funk, Kent, Ohio

[73] Assignee: Davey Tree Expert Company, Kent, Ohio

[21] Appl. No.: 453,989

[22] Filed: Dec. 28, 1982

[51] Int. Cl.³ .................. G05D 11/03; F16K 19/00
[52] U.S. Cl. .................................. 137/99; 239/126
[58] Field of Search ........................ 137/99; 239/126

[56] References Cited

U.S. PATENT DOCUMENTS

| | | | |
|---|---|---|---|
| 2,692,798 | 10/1954 | Hicks | 239/126 |
| 2,887,094 | 5/1959 | Krukemeier | 137/99 X |
| 2,954,737 | 10/1960 | Hoover | 137/99 X |
| 3,135,279 | 6/1964 | Dunklee, Jr. | |
| 3,386,623 | 1/1967 | Berrill et al. | |
| 3,496,970 | 1/1967 | Pontigny | |
| 3,765,605 | 10/1973 | Gusmer et al. | |
| 3,814,289 | 6/1974 | Robbins | |
| 3,815,621 | 6/1974 | Robinson | 137/99 |
| 3,865,308 | 2/1975 | Pringle et al. | |
| 3,894,690 | 7/1975 | Hill | 239/126 |
| 3,951,311 | 4/1976 | Johansson | 137/99 X |
| 3,967,634 | 7/1976 | Scherer et al. | |
| 4,002,271 | 1/1977 | Buck | |
| 4,392,508 | 7/1983 | Switall | 137/99 |
| 4,394,870 | 7/1983 | MacPhee | 137/99 |

FOREIGN PATENT DOCUMENTS 629419  12/1961  Italy ................................... 239/126

Primary Examiner—Robert G. Nilson
Attorney, Agent, or Firm—Dowell & Dowell

[57] ABSTRACT

A volume proportioning system includes a pressurized supply of a primary carrier liquid, one or more sources of concentrate, a proportioning interconnection between the carrier liquid and the sources of concentrate by which the proportions are controlled regardless of the flow rate or pressure of the carrier liquid, in which the carrier liquid also provides the motive power for moving the concentrate and the carrier liquid itself to an operator controlled discharge point, the discharge being infinitely variable under the control of an operator.

6 Claims, 3 Drawing Figures

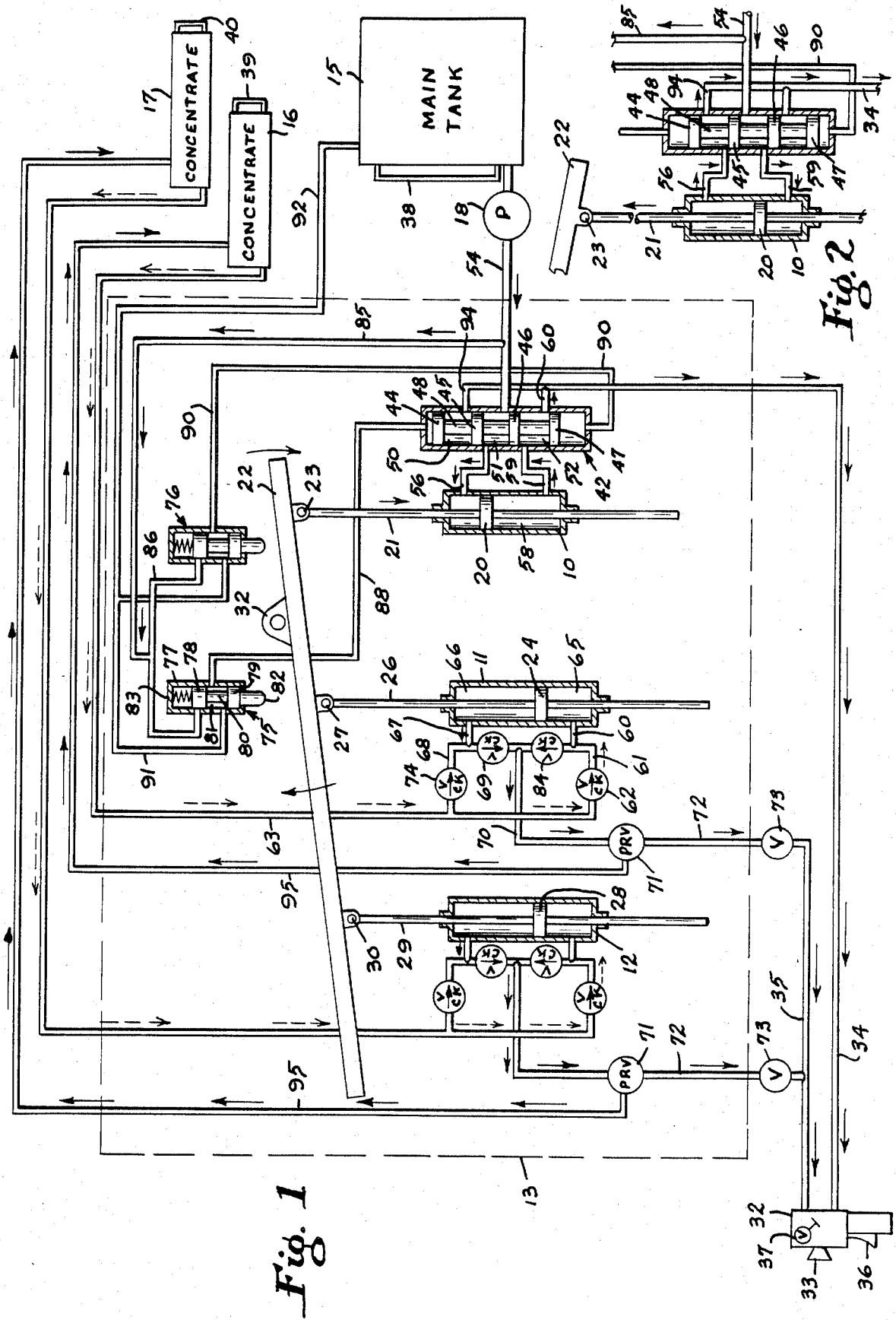

FLOW VOLUME PROPORTIONING SYSTEM

BACKGROUND OF THE INVENTION

This invention relates to flow control devices in which two or more liquids are moved or pumped from their individual sources of supply to a common discharge outlet. The invention is concerned more particularly with a control system for a mobile supply source for agricultural purposes such as are commonly used for supplying of fertilizers and weed and pest controls to lawns and gardens.

During approximately the past decade a large industry has developed in the treatment of lawns by companies specializing in this business. A typical lawn care program involves several treatments during the year which are typically as follows:
Early Spring—Crabgrass control, fertilization.
Late Spring—Broadleaf weed control, fertilization.
Summer—Weed control, insect control, fertilization.
Fall—Broadleaf weed control, fertilization.

Basic application methods have included the use of dry granular chemicals, liquid suspension, and soluble liquids.

The use of dry chemicals has not gained widespread acceptance since the narrow width of the spreader limits the rate of application and increases the amount of time required for treatment.

A liquid suspension or slurry involves the use of solids that require agitation in order to avoid their settling out of the solution. Such method is not in widespread use because it affords no significant advantage, but increases the complexity and cost of the application equipment.

The spraying of liquid chemicals from a single premixed batch tank is becoming a popular form of application. In this type system all chemicals that are to be sprayed during the day are mixed in a large tank mounted on a truck. A pump, ordinarily driven by the truck engine, provides the required pressure for a spray gun used by the operator. Since the lawn may have confined or narrow areas due to shrubbery and borders, the operator must vary his walking speed and the rate of discharge of the liquid to apply the proper amount to each area.

Disadvantages of the foregoing liquid chemical system include (a) the premixture of chemicals may not exactly suit the requirements of a particular lawn; (b) certain products, particularly insecticides, break down rapidly after being mixed; and (c) disposal of unused mixture in the tank may present a problem.

The present invention, in common with other known systems, meters selected chemical solutions into the spray line, thereby eliminating premixing, and permitting the user to select and apply the desired chemical substances for each lawn without increasing the preparation or the application time. The advantages of this include that material cost may be reduced since unnecessary chemicals are eliminated. Furthermore, since the chemicals are mixed just prior to application, their effective life is extended. A further advantage is that the particular problem of disposing of unused pesticide contaminated sludge is avoided.

Presently available metering systems are generally of two types, proportional metering, or injection. One proportional metering type is powered by line pressure in which a waterwheel measures the flow rate. These are inherently inaccurate when metering low flow rates as occur in lawn spraying and their inability to tolerate relatively high line pressures. A second type of proportional metering device uses a bladder to store the metered chemical and a proportioning valve to control metering. In this type system, as the line pressure increases, the pressure exerted on the bladder also increases permitting the proportioning valve to function independently of line pressure. The principal disadvantages are limited storage capacity, inability to handle wettable powders and lack of flexibility caused by pressure loss in long metered lines.

The injection systems are ordinarily powered by an electrically driven pump, compressed air, or compressed carbon dioxide. Such systems inject at a predetermined flow rate and are, therefore, not capable of proportioning according to the flow rate of fertilizer. In addition the small injection orifices are susceptible to temperature fluctuations, and wear and abrasion resulting in undependable injection rates.

Previously known systems are viewed as unsatisfactory in meeting some or all of the requirements of a lawn spraying system. The requirements are:
(1) Variable Flow—must meter chemicals at variable flow rates while maintaining precise mixture ratios.
(2) Proportion Small Flow Rates—must meter small amounts of chemicals (e.g., 0.25 to 2 ozs./gal.) in proportion to the large fertilizer flow (up to 3 to 5 gals./per minute).
(3) Monitoring—provide a convenient method of determining if the chemcials are being metered properly.
(4) Noncritical Malfunctions—should the system malfunction, it should do so in a manner as not to damage a lawn (i.e., if metering is in error it will not over feed a particular chemical).
(5) Adaptable—the system must be adaptable to current mobile units already in use.
(6) Simple—simple to operate and maintain with crews that are primarily trained to deal with unsophisticated mechanical and electrical systems.
(7) Efficient—negligible increase in time to operate the system as compared with current known systems.
(8) Reliable—the equipment must be able to withstand the vibration and jolts from truck mounting as well as the corrosive effect of the chemicals.

The prior art has various flow control proportioning systems for two or more liquids. Thus the patent to Scherer et al. U.S. Pat. No. 3,967,634 discloses a plurality of cylinders that are connected to individual sources of fluid and which can dispense these to a common outlet in a desired proportion, the system control being driven from an additional pressurized source of fluid. Other patents disclosing two or more interconnected cylinders with proportional length leverage connections are disclosed in Robbins U.S. Pat. No. 3,814,289, Buck U.S. Pat. No. 4,002,271, Berrill et al. U.S. Pat. No. 3,386,623, and Pontigny U.S. Pat. No. 3,496,970. Other systems with interconnected proportioning devices are disclosed in Krukemeier U.S. Pat. No. 2,887,094, and Gusmer et al. U.S. Pat. No. 3,765,605.

Pringle et al. U.S. Pat. No. 3,865,308 discloses a plurality of interconnected sources feeding to a single discharge under the control of an operator.

SUMMARY OF THE INVENTION

The present invention includes a system that is adapted to meet the foregoing requirements. The invention contemplates a supply of primary carrier liquid and various liquid concentrates from which an operator can easily select the combination of ingredients required for a particular situation, and can maintain the proportioning regardless of variations in flow rate or pressure of his primary liquid. Furthermore, it is desirable that the operator be able rather easily to vary the proportions and the mixture of concentrates so that he can easily meet each need as it is encountered. For example, he may need to apply liquids to one lawn area using one blend of chemicals and then to a different lawn area requiring a different blend of chemicals. In addition, as the operator moves along the terrain there may be places in which the quantity required varies and hence he should be able to control the discharge from a low to a high level with infinite gradations therebetween.

In addition to the foregoing it is desirable that the carrier liquid itself furnish the power for the operation of the movement of liquid, thereby avoiding the necessity for a separate source of power.

Accordingly, it is an object of the invention to provide an operator controlled apparatus for discharging at an infinitely variable flow rate a carrier liquid and one or more concentrate liquids.

A further object is to provide an operator controlled system for a plurality of liquids in which one of the liquids provides the power for driving the other liquids and in which there is an interconnection between the apparatus associated with the driving liquid and with the other liquids so that their proportions remain the same and can be varied relatively easily if desired.

These and other objects of the invention will become apparent from the following description in conjunction with the accompanying drawings.

BRIEF DESCRIPTION OF THE DRAWINGS

FIG. 1 is a schematic layout of a preferred embodiment of the invention.

FIG. 2 is a layout of a fragmentary portion of FIG. 1 illustrating the driving cylinder, its associated four-way valve and the rocker arm in a different position.

DESCRIPTION OF THE PREFERRED EMBODIMENT

Figure 3:
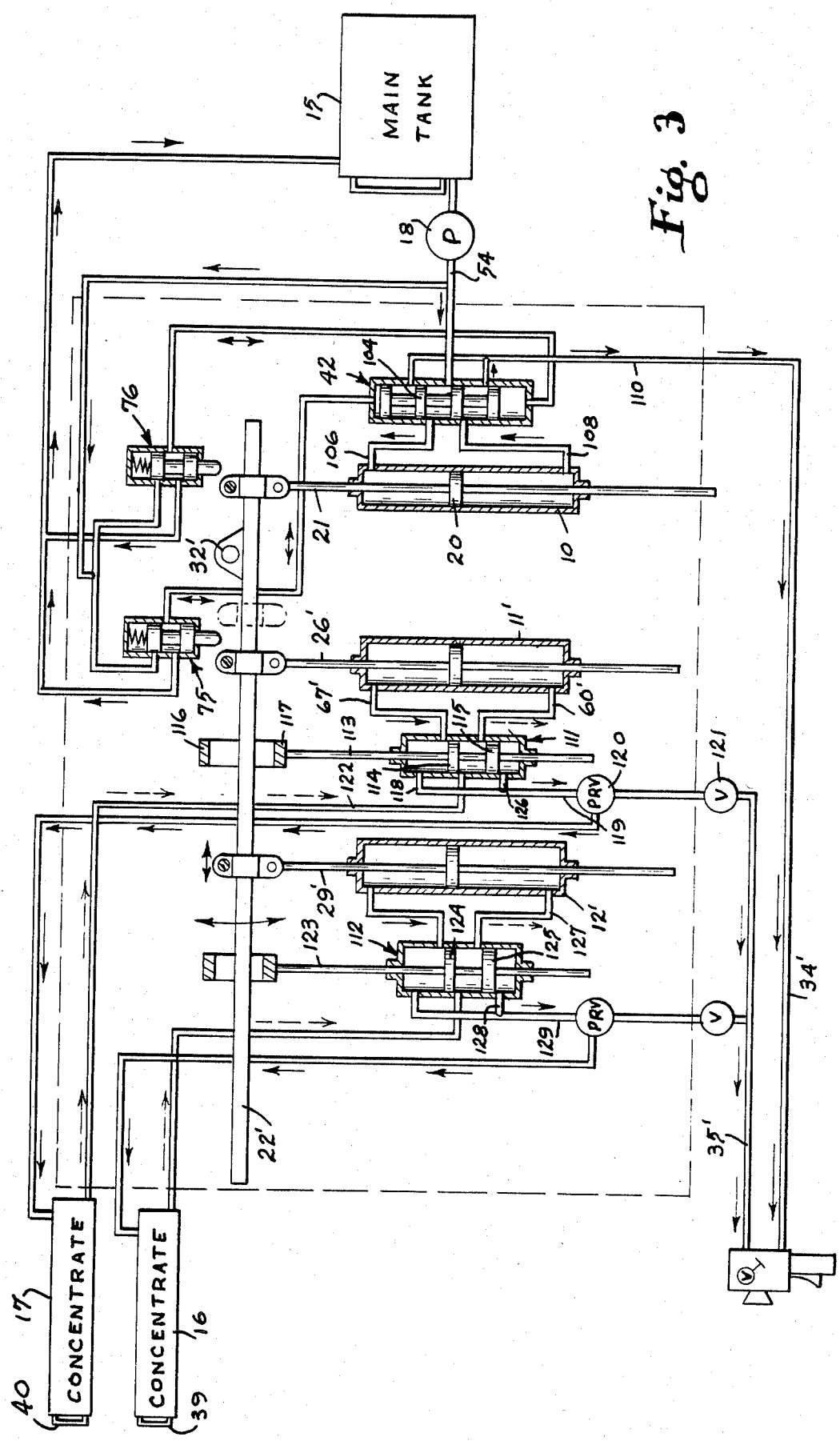
FIG. 3 is a schematic layout of a modification.

Referring to FIG. 1 a driving cylinder 10 and concentrate metering cylinders 11 and 12 are disclosed, it being understood that various numbers of metering cylinders may be employed.

These cylinders and the associated proportioning mechanism and connections may be mounted on a base plate indicated by the outline 13 and within a housing, not shown, which is of a relatively low height as compared to its length and width, to facilitate its mounting and transportation on a truck. In addition to the liquid lines illustrated, a main tank for water containing fertilizer 15, concentrate tanks 16 and 17, and a pump 18 receiving power from the truck are ordinarily mounted thereon exteriorly of the base 13.

Cylinder 10 has a piston head 20 which reciprocates therein and is connected to rod means 21 pivotably attached to rocker arm or lever 22 by pivot 23. Similarly, concentrate cylinder 11 has a piston head 25 connected to rod 26 and pivot connection 27 to the arm 22. In like manner cylinder 12 has piston head 28 connected to rod 29 and pivot 30 connected to rocker arm 22, the rocker arm 22 being mounted for oscillation on pivot 32 fixed to the base 13.

It will be apparent that the volume displaced within each of the cylinders 10, 11, and 12, by piston heads 20, 24, and 28, is proportional to the product of the area of the piston heads and the distance between the rocker arm pivot point 32 and the respective pivotal connections 23, 27, and 30 to each of the rods. In practice the sizes of the cylinders, the rocker arm and the lengths of the rods are calculated based on ordinary needs. The pivotal mounts 23, 27, and 30 are adjusted by conventional means, not shown, so that the effective stroke of each of the rods may be adjusted as required.

In accordance with the present invention liquid fertilizer containing water from the tank 15 is pumped by the pump 18 into the system and provides the power for operating the lever arm 22 in order to draw proportionate amounts of concentrates from the tanks 16 and 17 and force them under appropriate pressure to a user operated discharge gun 32 having a spray nozzle 33 for the combined flow from the water line 34 and concentrate line 35. The spray gun preferably has a finger operated control 36 for the water line and a thumb operated control 37 for the concentrate line in order that the operator may cause infinite variation of the spray from the two lines 34 and 35.

The main tank may have a sight gauge 38 and the concentrate tanks sight gauges 39 and 40 so that the operator may maintain a visual check on the quantity within each of these tanks.

Associated with the driving cylinder 10 is a four-way valve 42 having floating piston or spool therein with heads 44, 45, 46, and 47 connected by a rod 48 and providing enclosed spaces which are illustrated in FIG. 1 as 50, 51, and 52, through which liquid may pass in a selected direction.

As shown in FIG. 1 liquid passes from the main tank through line 54 into a centrally located opening 55 in valve 42 into the space 51 and thence through line 56 into the upper portion of cylinder 19 above the piston head 20. The water under pressure moves the piston head 20 downwardly thereby forcing water within the space 58 beneath the piston head out through the line 59 into a near side opening of the valve 42 into the space 52, discharging from a far side opening of space 52 through line 60 connected to the discharge line 34.

The movement of the piston head 20 and its rod 21 causes the rocker arm 22 to rotate about the pivot point 32. Thus, as the rod 21 moves downwardly as indicated in FIG. 1, the rods 26 and 29 move upwardly.

Movement of rod 26 upwardly moves the piston head 24 upwardly, the lower portion of which is connected by line 60 to line 61 through check valve (one-way) 62 to line 63 to the concentrate tank 16, thus, drawing liquid therefrom into the space 65 beneath the piston head 24. At the same time liquid in the upper space 66 is discharged through the upper pipe 67 into line 68 through check valve 69 into line 70 through pressure operated relief valve 71 into line 72 to the discharge line 35. A manually controlled valve 73 in line 72 permits the operator to close the line if desired.

The metering cylinder 12 is constructed and operates similarly to metering cylinder 11, and, therefore, no separate description is viewed as necessary.

The foregoing operation continues until the rocker arm 22 engages and operates three-way switch 75. A similar three-way switch 76 is connected to switch 75 and they cooperate to control the position of the spool within the four-way valve 42. Each of the three-way switches includes a cylinder 77 having a free-floating spool with heads 78 and 79, connected by rod 80 providing a space 81 between the heads. The lower head 79 is connected to a feeler element 82 which extends through the lower end of the cylinder. At its opposite end a spring 83 between the upper piston head 78 and the cylinder end wall tends to urge the spool into the downward position illustrated in FIG. 1.

From the water supply line 54 a branch line 85 is connected to a common or header line 86 which communicates with the upper portion of each of the cylinders of the three-way switches. In the position indicated in FIG. 1 the opening into the cylinders from the line 86 is blocked by the piston heads 78. The central portion of the cylinder of switch 75 is connected by line 88 to the upper portion of the cylinder of valve 42 and in communication with the space intermediate the end of the cylinder and the head 44. Similarly line 90 communicates with the central portion of the cylinder of three-way switch 76 and connects it to the bottom of the cylinder of four-way valve 42 and, therefore, in communication with the space intermediate such end of the cylinder and the head 47.

In the position of the spools of the three-way switches 75 and 76 illustrated in FIG. 1, the lines 88 and 90 communicate with the space 81 between the heads 78 and 79 and such space also communicates with return line 91 from each of the three-way switches to line 92 into the main tank 15.

When the rocker arm has moved so that the piston head 20 in cylinder 10 is in its lowermost position, the rocker arm will engage feeler element 82 of three-way switch 75 and move the spool into upper position. In the upper position the flow from lines 85 and 86 will pass through the space between the heads 78 and 79, the flow into line 91 being blocked by the head 79, and into the line 88 into the space above the head 44 of the four-way valve 42. This will urge the spool of the valve downwardly to an alternate position represented in FIG. 2. From the lower end of the cylinder of valve 42 liquid can flow out of line 90, through the three-way switch 76, line 91, line 92, back to the main tank 15.

The shifting of the spool in the four-way valve 42 to the lower position of FIG. 2 will result in connecting through the four-way valve the supply line 54 and the line 59 into the lower portion of cylinder 10. This will urge the piston head and its rod 21 upwardly back toward the position illustrated in FIG. 1. At the same time liquid from the upper portion of piston 10 is discharged through line 56, through the four-way valve 42 into the discharge line 94 to line 34 to the spray gun. The upward movement of the right-hand portion of the rocker 22 will continue until it reaches its limit in which event the feeler element 82 of three-way switch 76 is moved to upper position.

In such upper position the flow from line 85 into line 86 passes through the three-way switch 76 into line 90, the flow into line 91 being blocked, and into the lower portion of the cylinder of four-way valve 42, thus returning it to the position illustrated in FIG. 1 for resumption of the operating cycle.

The movement of rod 21 upwardly will result in movement of rods 26 and 29 downwardly. Downward movement of rod 26 moves the piston head 24 downwardly, the upper portion being connected by line 67 to line 68 through check valve 74 to line 63 to the concentrate tank 16, thus, drawing liquid therefrom into the space 66 above the piston head 24. At the same time liquid in the lower space 65 is discharged through the lower pipe 60 into line 61 through check valve 84 into line 70 through pressure operated relief valve 71 into line 72 to the discharge line 35.

The metering cylinder 12 is constructed and operates similarly to metering cylinder 11, as stated above.

In the system illustrated the pressure relief valves 71 permit liquid from the metering cylinders to be returned through return line 95 to their respective concentrate tanks in the event that the outlet line is turned off or becomes plugged, thereby avoiding the buildup of excessive pressure in the line 70 or either of the lines leading to it.

In a situation in which the operator does not need all of the concentrates he may selectively close the valve from any unneeded line and the pressure relief valve will permit the liquid to flow in a circuit back and forth from the concentrate tank without building up pressure excessively in any part of the system.

In the modification of FIG. 3 the driving cylinder 10, associated four-way valve 42, three-way switches 75 and 76, and the connecting lines are the same as in FIGS. 1 and 2. The movement of the rocker arm 22' about its pivot 32' will cause proportional movement of the rods 26' and 29' associated with the cylinders 11' and 12'.

However, instead of using check valves associated with concentrate metering cylinders 11' and 12', four-way valves 111 and 112 are used with each of the cylinders to control the flow.

In the position illustrated in FIG. 3 in which the end of the rocker arm 22' is being drawn downwardly by driven cylinder rod 21' the rods 26' and 29' are being drawn up. Thus, referring to cylinder 11' liquid in the upper portion is discharged through line 67' into the upper portion of four-way valve 111. Four-way valve 111 is a cylinder having a rod 113 and piston heads 114 and 115 connected thereto, the position of which controls flow through the valve 111. The upper portion of the rod 113 has engageable detents 116 and 117 which are moved by the rocker arm 22' as it oscillates from one extreme to the other.

In FIG. 3 the rod 113 is illustrated in its lower position in which flow from cylinder 11' passes through line 67', through the upper portion of valve 111 into line 118 and discharge line 119 to pressure regulating valve 120 through manual control valve 121 to discharge line 35'. Simultaneously, liquid from concentrate tank 17 is drawn into the lower part of cylinder 11' through line 60', valve 111, and line 122 to tank 17.

When rocker arm 22' moves rods 26' and 29' to their upper extreme this moves valve rods 113 and 123 to upper position, thus, shifting the position of these rods, and the piston heads 114, 115, 124, and 125 to cause reversal of the flow to and from the cylinders 11' and 12'.

The flow and connection with respect to metering cylinder 12' are similar to those of metering cylinder 11', and, therefore, separate discussion appears to be unnecessary.

After the flow into and from cylinder 10 has moved the piston head 20 and rod 21 to the lower position the three-way switches 75 and 76 will cause the direction of flow through cylinder 10 to reverse as previously described.

At the same time the rods 26' and 29' associated with the cylinders 11' and 12' will also be caused to move downwardly due to engagement with the rocker arm 22'. This will cause flow from the lower portion of the cylinder 11' to pass through line 60' into the lower portion of the four-way valve 111 into line 126 to line 119, and from cylinder 12' to pass through line 127 into the lower portion of the four-way valve 112 into line 128 to line 129. At the same time concentrate liquid is drawn into the upper portion of the cylinders.

I claim:

1. Apparatus for discharging at an operator controlled variable flow rate a carrier liquid and one or more concentrate liquids, comprising a source of carrier liquid under pressure, at least one source of concentrate liquid, means driven by said carrier liquid and moveable between first and second positions, metering means connected to said source of concentrate liquid, first valve means connecting said source of carrier liquid to said driven means and to a first discharge conduit, said first valve means having control means moveable from a first to a second position and said control means being engageable by said driven means causing said control means to shift back and forth from said first to said second position in response to movement of said driven means from a first to a second position to control operation of said first valve means to reverse the direction of movement of said driven means, whereby said carrier liquid is operative to drive said driven means and be discharged therefrom through the first discharge conduit, second valve means connecting said metering means to the source of concentrate liquid and to a second discharge conduit and operative to reverse the direction of flow to and from said metering means, said driven means connected to drive proportionally said metering means, whereby operation of said driven means controls the flow of concentrate liquid to said metering means and from said metering means to the second discharge conduit, conduit means for returning concentrate liquid, third valve means for controlling the return of said concentrate liquid, and first and second operator controlled discharge means individually connected to the first and second discharge conduits for said carrier liquid and for said concentrate liquid for individually controlling the flow therefrom.

2. The invention of claim 1 in which said first valve means is a four-way piston type valve and in which said second valve means comprises a series of check valves.

3. The invention of claim 1 in which the valve control means for the first valve means comprises a floating piston having feeler means engageable by said driven means.

4. The invention of claim 1, said third valve means opening in response to a predetermined pressure to permit liquid in said second discharge conduit to return to said source of concentrate liquid.

5. The invention of claim 1 in which said first and second valve means each comprise a piston, and means connected to the driven means of said first valve means for shifting the first and second valve means in response to oscillation of said driven means.

6. The invention of claim 1 in which the means driven by said carrier liquid is a driving cylinder, piston means carrying double end rod means in said cylinder, and a lever arm pivotally mounted adjacent to said driving cylinder and connected to said rod means, in which the metering means connected to said source of concentrate liquid is a concentrate metering cylinder, means carrying double end rod means in said concentrate metering cylinder, said rod means connected to said lever arm in spaced relation to said driving cylinder rod means connection, whereby movement of said lever arm by said driving cylinder rod means causes proportional movement of said metering cylinder rod means, and said second valve means having control means movable from a first to a second position and engageable by said lever arm causing said valve control means to shift back and forth from said first to said second position in response to oscillation of said lever arm, said second valve control means in said first position causing said second valve means to connect said source of concentrate liquid to a first end of said concentrate metering cylinder to draw said concentrate liquid into said metering cylinder, and to connect the second end of said metering cylinder to a concentrate discharge conduit, and said second valve control means in said second position causing said second valve means to connect said source of concentrate liquid to the second end of said concentrate metering cylinder to draw said concentrate liquid into the said second end of said metering cylinder, and to connect the first end of said metering cylinder to said concentrate discharge conduit.

* * * * *